US011023902B2

(12) United States Patent
Gibson et al.

(10) Patent No.: US 11,023,902 B2
(45) Date of Patent: Jun. 1, 2021

(54) SYSTEM AND METHOD FOR PROVIDING LOCALIZED PRODUCT OFFERINGS PUBLICATIONS

(75) Inventors: Donald Michael Gibson, Chicago, IL (US); Richard J. West, St. Charles, IL (US); Dana L. Schueller, Chicago, IL (US); Anthony Hyun, Park Ridge, IL (US); Michelle Bohannon, Roselle, IL (US); Jeffrey Suttle, St. Charles, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 27 days.

(21) Appl. No.: 13/249,588

(22) Filed: Sep. 30, 2011

(65) Prior Publication Data

US 2013/0085823 A1  Apr. 4, 2013

(51) Int. Cl.
*G06Q 30/02* (2012.01)
(52) U.S. Cl.
CPC .................................. *G06Q 30/02* (2013.01)
(58) Field of Classification Search
CPC ..... G06Q 30/00; G06Q 30/0207–0277; G06Q 30/02
See application file for complete search history.

(56) References Cited

U.S. PATENT DOCUMENTS 7,099,833 B1 * 8/2006 Sundaresan .......... G06Q 20/201
705/20
2005/0159974 A1 7/2005 Moss et al.
2005/0256778 A1 * 11/2005 Boyd ................ G06Q 30/0244
705/14.43
2007/0185785 A1 8/2007 Carlson et al.
2007/0288313 A1 * 12/2007 Brodson ............... G06Q 20/20
705/14.17
2008/0270579 A1 * 10/2008 Herz ..................... G06Q 30/02
709/219
2009/0187486 A1 * 7/2009 Lefenfeld ............. G06Q 30/02
705/14.73
2010/0075638 A1 * 3/2010 Carlson .................. H04W 4/12
455/412.1

(Continued)

OTHER PUBLICATIONS

International Search Report and the Written Opinion of the International Searching Authority, or the Declaration, in International application No. PCT/US12/58239, dated Dec. 10, 2012. (7 pages).

*Primary Examiner* — David J Stoltenberg
*Assistant Examiner* — Michael J Cross
(74) *Attorney, Agent, or Firm* — McAndrews, Held & Malloy, Ltd.

(57) ABSTRACT

A retailer system responds to a request to view an electronic product offerings publication by using data indicative of a geographic location to select from a plurality of retailer locations at least one retailer location and by retrieving inventory related information for the selected at least one retailer location. The retrieved inventory related information is then used to select product offerings from a repository of product offerings whereupon an electronic product offerings publication container is populated with the product offerings selected from the repository of product offerings. The populated electronic product offerings publications container is then returned to the requester as the requested product offerings publication.

20 Claims, 13 Drawing Sheets

(56) References Cited

U.S. PATENT DOCUMENTS

| | | | |
|---|---|---|---|
| 2010/0088166 A1* | 4/2010 | Tollinger | G06Q 20/20 |
| | | | 705/14.13 |
| 2010/0114857 A1* | 5/2010 | Edwards | G06F 16/743 |
| | | | 707/709 |
| 2010/0145784 A1* | 6/2010 | Sriver | G01C 21/20 |
| | | | 705/14.25 |
| 2011/0125593 A1* | 5/2011 | Wright | G06Q 30/02 |
| | | | 705/14.73 |
| 2011/0213655 A1* | 9/2011 | Henkin | G06Q 30/0251 |
| | | | 705/14.49 |

* cited by examiner

Tools - View All

CATEGORY

Air Compressors &
Air Tools
Auto & Me Share This
Tools
Hand Tool     Select a Service for Sharing
Portable P
Power Too        ☒ E-mail      ☐ Facebook
Accessori
Tool Stora       ☐ Delicious   t Twitter Close ⊗

1202 tools  9 Products

◁ Prev    ▽ ‖‖‖‖ △    Next ▷         Collapse Ad ↙    Shopping List ▽

Sort By: Most Viewed ▷

Craftsman® C3® 19.2-
volt compact lithium-
$69.99 $119.99
Thru 08/06/11

Craftsman C3 lithium-
Ion battery
$59.99 $79.99
Thru 08/06/11

Craftsman 7-pc.
locking flex wrench
$62.49
Thru 08/06/11

Craftsman 8-pc.
reversible wrench
$49.99
Thru 08/06/11

Craftsman 309-pc.
mechanic's tool set
$199.99
Thru 08/06/11

Craftsman 12-drawer
tool chest, 500-lb.
$179.76 $249.99
Thru 08/06/11

Craftsman 2-drawer
middle chest
$39.88 $86.99
Thru 08/06/11

NARROW BY

Price

Shop Departments

SYSTEM AND METHOD FOR PROVIDING LOCALIZED PRODUCT OFFERINGS PUBLICATIONS

BACKGROUND

The subject invention generally relates to retail systems and, more particularly, relates to a system and method for providing localized product offerings publications.

SUMMARY

Described hereinafter is a system and method for providing localized product offerings publications. More particularly, the following describes a system wherein a collection of product offerings is developed using a model that takes into consideration various data inputs such as, but not limited to, inventory in a local store, competitive pricing, price elasticity, and local market conditions. The developed, localized collection of product offerings may then be published via known marketing vehicles, such as via email communication, web page displays, mobile phone apps, etc. Consumer responses to the published, localized collections of offers are fed back into the system where the offer performance data may be used to change the weighting of the various inputs provided to the model to thereby optimize the model.

While the forgoing provides a general overview of some of the various features and functionalities of the subject invention, a better understanding of the objects, advantages, features, properties, and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIG. 3 illustrates a screen shot of an exemplary, localized product offerings publication;

FIG. 4 illustrates a screen shot of an exemplary user interface for changing a location for use in accessing further localized product offerings publications;

FIG. 7 illustrates an exemplary user interface for filtering localized product offerings in a retail department of a retailer by brand;

FIG. 8 illustrates an exemplary user interface for filtering localized product offerings in a retail department of a retailer by price;

FIGS. 10-13 illustrate exemplary user interfaces for accessing functionalities associated with a product offering within a listing of product offerings.

DETAILED DESCRIPTION

With reference to the figures, the following describes a system and method for generating and distributing product offerings publications. As described in greater detail below, the product offerings publications can be localized considering any type of location data that is associated with a consumer, e.g., a specified zip code, GPS or cellular phone network generated location data, or the like, and the localized product offerings publications can be published via the web, email, smart phone app, or the like. The generated localized product offerings publications may be further personalized for a consumer by considering additional data points collected from the consumer. In addition, consumer responses to distributed product offerings publications can be utilized to optimize an engine which is utilized to generate future product offerings publications.

Figure 1:
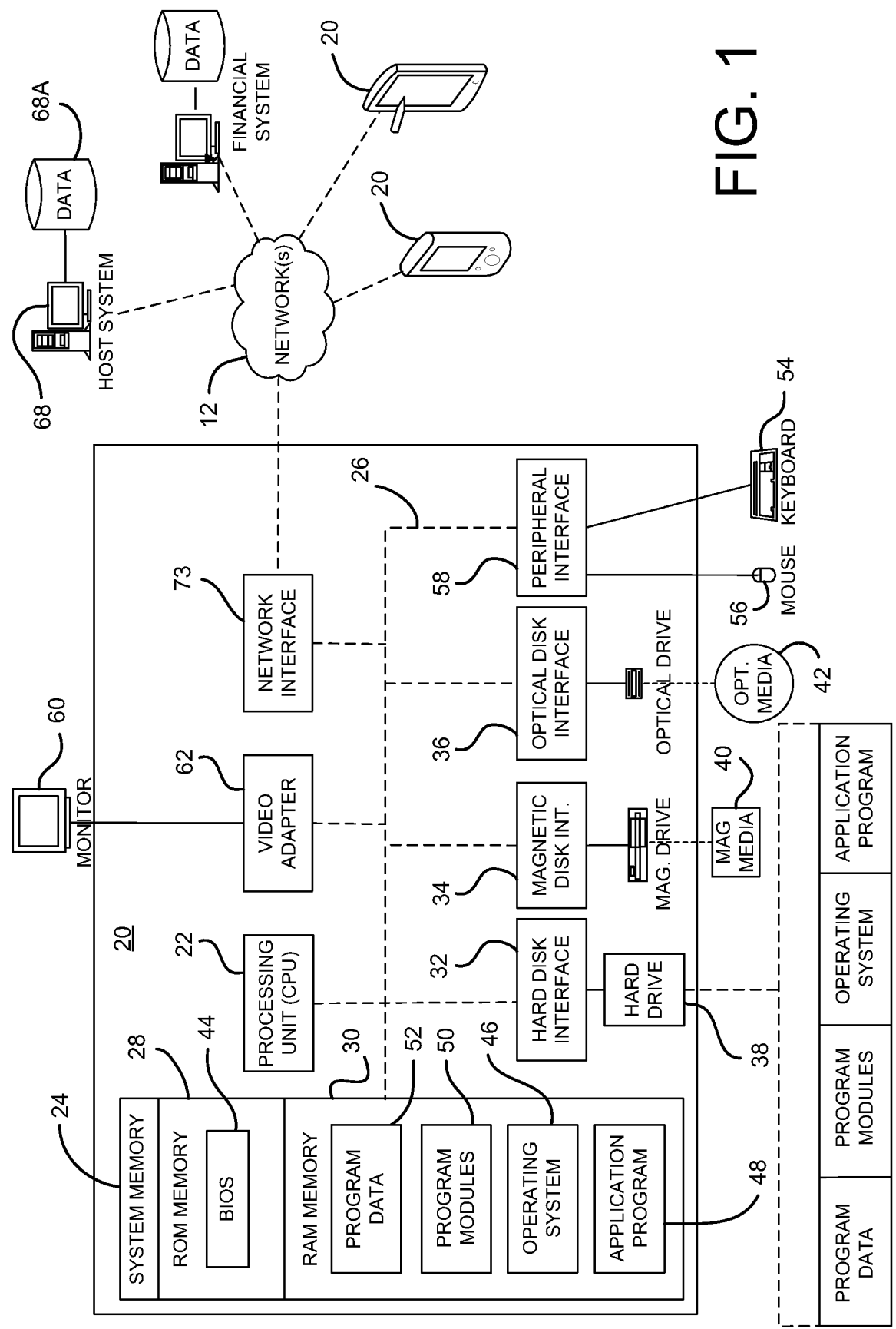
FIG. 1 illustrates in block diagram form components of an exemplary system for generating and distributing product offerings publications.

Turning to FIG. 1, illustrated is an exemplary system for generating and distributing product offerings publications. As illustrated, the exemplary system includes a processing device 20 whereby a customer may register with and/or otherwise access an online retail channel hosted by a retailer system 68 associated with one or more retail establishments to, among other things, view and purchase product being offered for sale by the retail establishment(s). As will be appreciated, during the registration process the customer may establish a log-in name/password combination for providing secure and recognized access to the retailer system 68 (which information and/or cookies provided to the processing device 20 will additionally allow the retailer system 68 to track data points associated with the online usage of the retailer system 68 by the customer—such as pages viewed, products purchased, etc.), provide a contact email address, phone number, or other unique identifier, provide demographic information such as age, gender, preferences, interests, home location, office location, etc. As a result of the registration process (which may also be done by the customer while within the retail establishment), the customer will additionally be associated with a unique customer ID, which customer ID may, but need not, be reflected on a physical and/or digital rewards card that will be provided to the customer. For example, the customer ID may be reflected in a device having a machine readable code, such as a barcode imprinted on a physical rewards card or be otherwise displayable/transmittable via use of a device such as a smart phone. Using the same or another processing device, the customer may additionally receive from the retailer system 68 published product offerings, digital incentives, and/or other communications that will be associated with their customer ID. While illustrated in the exemplary form of a personal computer, it is to be understood that the processing device 20 may be embodied in any type of device having the ability to execute instructions such as, by way of example only, a personal-digital assistant ("PDA"), a smart phone, a tablet computing device, or the like. Furthermore, while described and illustrated in the context of a single processing device 20, those skilled in the art will also appreciate that the various tasks described herein may be practiced in a distributed environment having multiple processing devices linked via a local or wide-area network, such as the Internet, whereby the executable instructions may be associated with and/or executed by one or more of the multiple processing devices.

More particularly, to provide a means for a purchaser to access the online channel of the retailer(s) (and to perform various tasks as necessary) the processing device 20 preferably includes a processing unit 22 and a system memory 24 which may be linked via a bus 26. Without limitation, the bus 26 may be a memory bus, a peripheral bus, and/or a local bus using any of a variety of known bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated physically embodied, i.e., non-transitory, computer-readable media allow for the storage of instructions, data structures, program modules, and the like for execution by the processing unit 22 of the processing device 20. Those skilled in the art will further appreciate that other types of physically embodied computer-readable media that can store data and/or executable instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories. Meanwhile, the program modules that may be stored in one or more of the memory/media devices may include a basic input/output system (BIOS) 44 which contains the basic routines that help to transfer information between elements within the processing device 20, such as during start-up, an operating system 46, one or more applications programs 48 (such as a Web browser), other program modules 50, and/or program data 52.

To allow a customer to enter commands and information into the processing device 20, e.g., to create or upload task related instructions, to search for and purchase product, to access product offerings publications, to indicate how an order for product is to be fulfilled, etc., input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers. Still further, the processing device 20 may be location aware, e.g., have a GPS system or the like, whereby data associated with a location of the processing device 20 is accessible to the system to thereby allow the system to generate and provide information that is relevant to such current location, such as localized product offerings publications.

As noted above, the processing device 20 may also utilize logical connections to one or more remote processing devices, such as a retailer system 68 having associated data repository 68A. As will be understood, the data repository 68A may maintain a database of product that is being sold by the retailer(s), stocking information related to the product that is being sold by the retailer(s), data indicative of local market conditions and price elasticity, customer related information (including information concerning past purchasing histories of particular customers, product viewing histories of particular customers, demographic information for particular customers, incentives available for and/or being offered to particular customers, etc.), financial information, and the like type of data used in commerce. While the retailer system 68 has been illustrated in the exemplary form of a server computer, it will be appreciated that the retailer system 68 may, like processing device 20, be any type of device having processing capabilities. Similarly, it will be appreciated that the retailer system 68 need not be implemented as a single device but may be implemented in a manner such that the tasks performed by the retailer system 68 are distributed amongst a plurality of processing devices/databases located at the same or different geographical locations and linked through a communication network. Additionally, the retailer system 68 may have logical connections to other third party systems 80 via the network 12 and, via such connections, will be associated with functions that are supported by and data repositories that are linked to such other third party systems. Such third party systems may include, without limitation, systems of banking, credit, or other financial institutions, systems of third party providers of product, systems of shipping/delivery companies, systems that support social networking, etc.

For performing tasks as needed, the retailer system 68 may include many or all of the elements described above relative to the processing device 20. In addition, the retailer system 68 would generally include executable instructions, that are likewise stored on physically embodied memory devices, for, among other things, supporting online retail channel services, supporting physical retail channel services, i.e., in store, maintaining records, etc. The retailer system 68 may thus include links to point-of-sale (POS) devices, e.g., cash registers, inventory monitoring system, etc. that are located within one or more retail stores without limitation. As will also be described in greater detail hereinafter, the retailer system 68 further has instructions for using location data and data inputs, such as inventory in a local store, competitive pricing, price elasticity, local market conditions, consumer preference information, etc. to, among other things, generate product offerings publications for dissemination to consumers.

Communications between the processing devices 20 and the retailer system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing devices 20, or portions thereof, may be stored in the memory storage device(s) associated with the retailer system 68.

Figure 2:
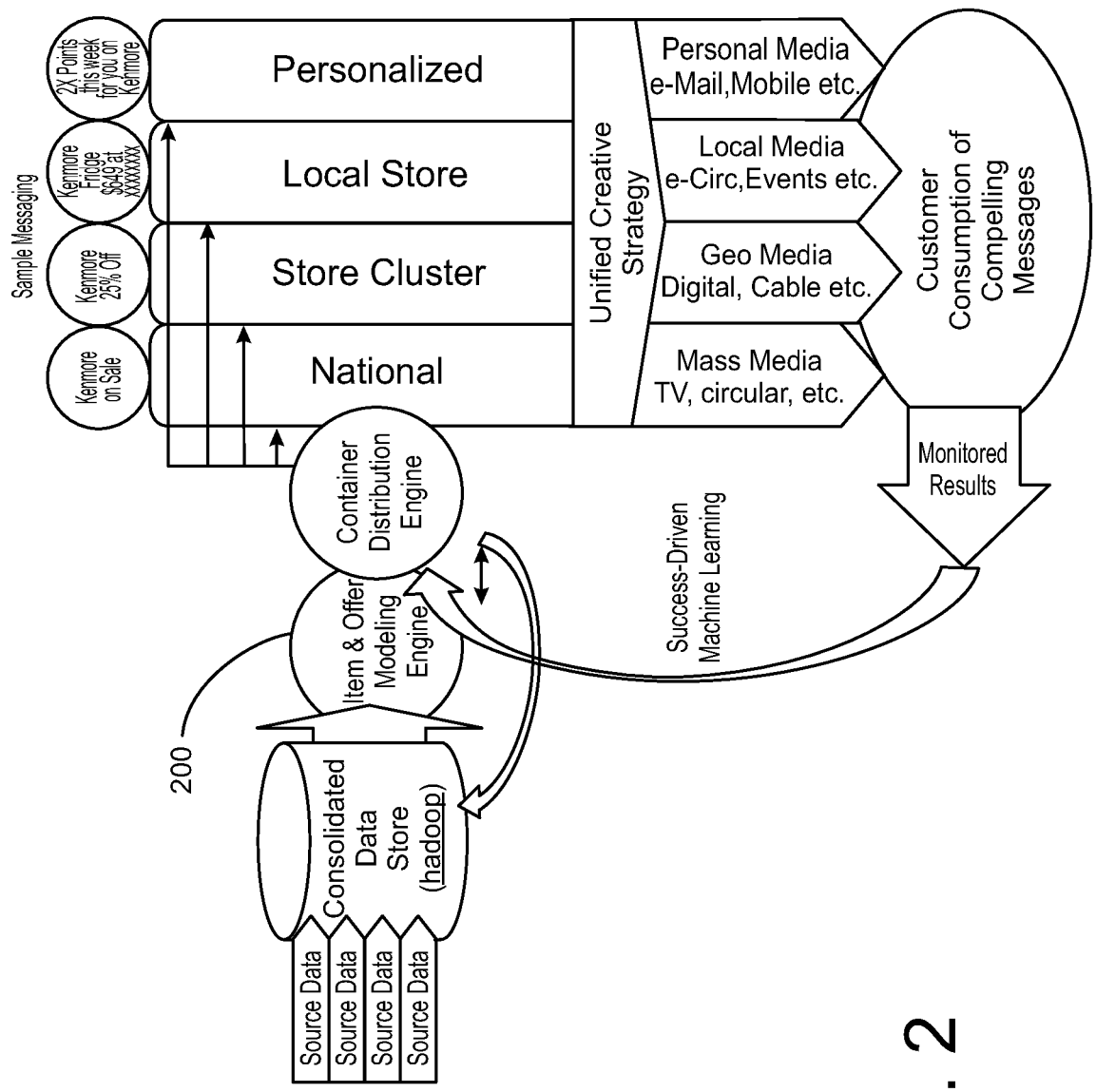
FIG. 2 illustrates an exemplary method for generating product offering publications and for distributing the same.

For generating and distributing product offerings publications, the retailer system 68 includes a modeling engine 200 as illustrated in FIG. 2. The modeling engine 200 functions to select from a database of product offerings particular product offerings for inclusion in a product offerings publication which is to be disseminated to one or more consumers. The modeling engine 200 particularly selects product offerings for inclusion within a product offerings publication by considering one or more of a location (e.g., as indicated by a provided zip code, GPS data, information within a consumer profile, or the like), real-time inventory within stores (whether in a single store, in multiple stores within a given region, and/or all stores nationally), competitive local, regional, or national pricing for products (which competitive pricing data could be used to modifying the pricing within selected product offers for given locals), local conditions (e.g., current or predicted weather conditions in a given location), preferences of a consumer, and the like. By way of example, the modeling engine 200 may select for inclusion within a product offerings publication product offerings which are to be made available to consumers nationally, in a region (e.g., a store cluster), and/or at a particular, single store. Furthermore, these product offerings publications can be published for all consumers or the product offerings publications can be further personalized for individual consumers, for example, by excluding from a product offerings publication those products that the system knows a given consumer has no interest in purchasing while adding to a product offerings publication products that the system believes a consumer might be interested in purchasing considering such data points as prior purchasing histories for the consumer, lists created by the consumer, product viewing histories of the consumer, etc. As further illustrated in FIG. 2, the product offerings generated by the modeling engine 200 can then be distributed to consumers using conventional distributions vehicles such as mass media (e.g., TV, print circulars, web pages, etc.) and/or personal media (e.g., emails, mobile apps, etc.). Information concerning the performance of such offers (e.g., did the consumer buy or view any product listed in the offering?) may be further provided back to the modeling engine 200 to thereby allow the modeling engine 200 to change the weights that are to be applied to the various input data points which weights are used, in a conventional manner, to determine the importance to be given to the various input data points when selecting product offerings for inclusion within any given product offerings publication. In this manner, the modeling engine 200 may optimize the process by which product offerings are selected when future product offering publications are to be generated.

Figure 3:
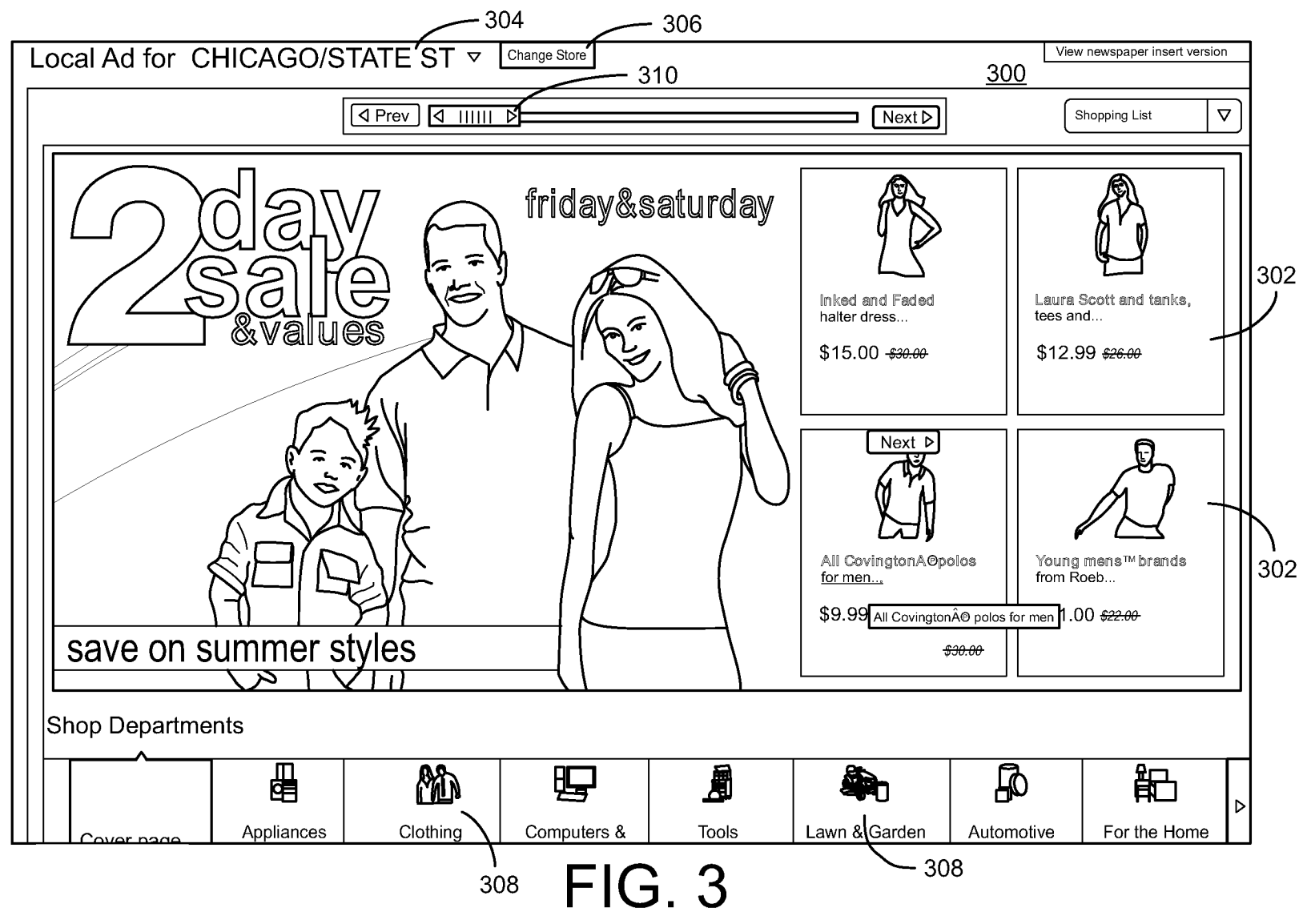
Figure 4:
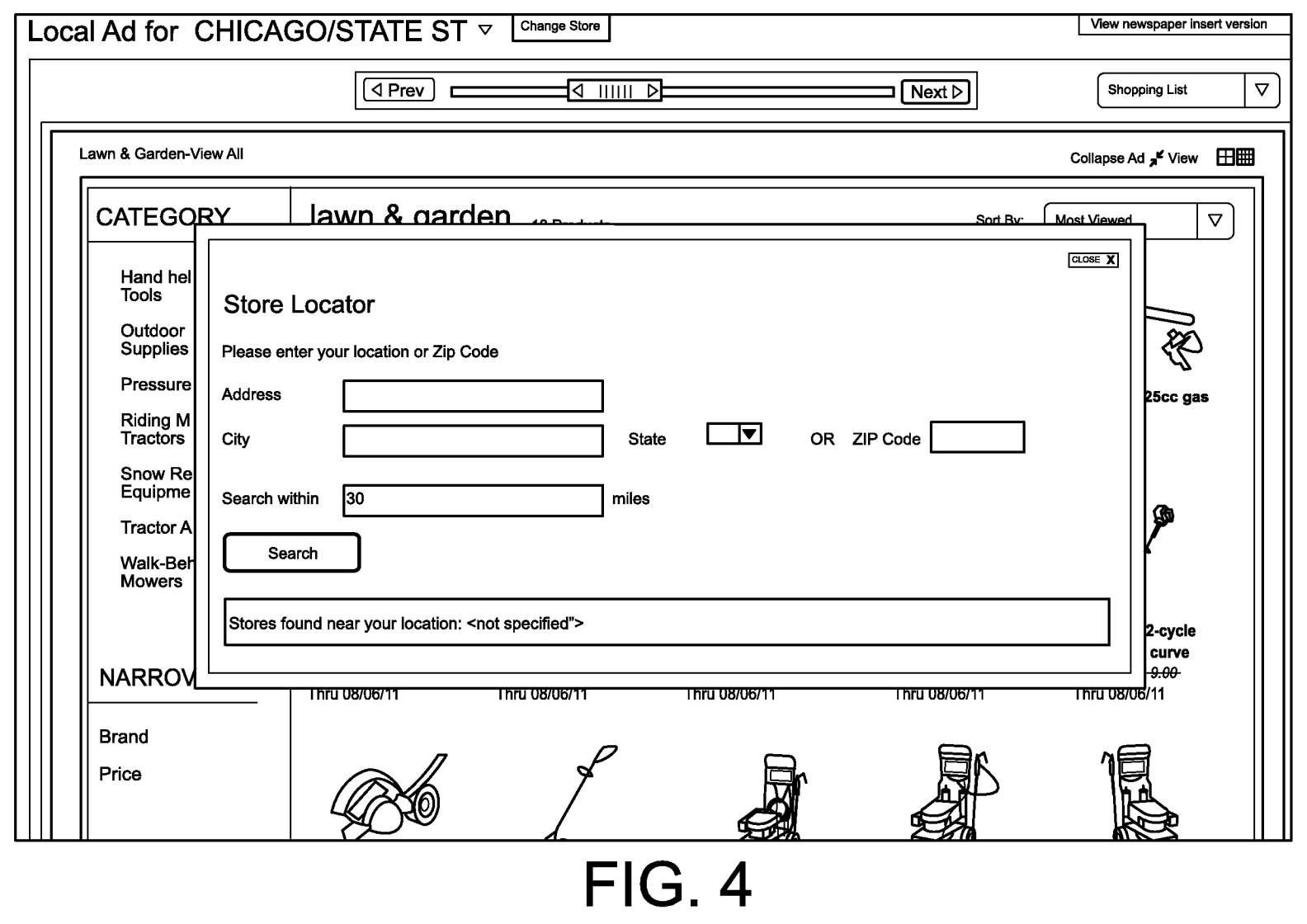

When presented via an electronic device 20, e.g., within a web browser, mobile app, or the like, the product offerings publication generally comprises a container template that is filed in with product offerings as selected by the modeling engine 200 considering the various data points as described above. By way of non-limiting example, FIG. 3 illustrates a product offerings container template 300 that is populated with product offerings 302 for an indicated store 304. The container template 300 may additionally include selected advertising images and/or videos as necessary. In this example, the indicated store 304 is determined by the system server 68 as being a store that is located within a vicinity of a given location wherein the location is determined from a provided zip code, IP address of an accessing device 20, cellular network or GPS coordinate obtained from an accessing device 20, or the like. The indicated store 20 may be changed by a consumer, for example by selecting a change store icon 306 and by providing location information as shown in FIG. 4. In any event, when populating the container template 300, the engine 200 of the system server 68 considers at least the inventory status of one or more stores associated with a location (which inventory information is preferably obtained by the system in real-time in response to the user requesting access to a product offerings publication) to thereby select which product offerings to include with the container template 300. It will therefore be appreciated that, based upon the inventory status at given stores and/or retailer distribution points associated with a retailer, the product offerings ultimately included in product offerings publications that are retrieved by consumers may vary depending upon the location data that is used to generate the product offerings publications. As described above, the offerings 302 for products that are available to be purchased (as placed into the product offerings publication 300 by the modeling engine) may additionally reflect pricing that is store or regionally specific (e.g., to reflect competitive pricing considerations), may include offers for product that is reflective of current market conditions (e.g., snow shovels if snow is forecast in the market, it is winter in the market, etc.), may include offers for product that is reflective of the needs of a particular consumer (e.g., considering previous purchasing histories, life events—such as a pending move, marriage, etc.—for the customer, etc.), and the like.

Figure 5:
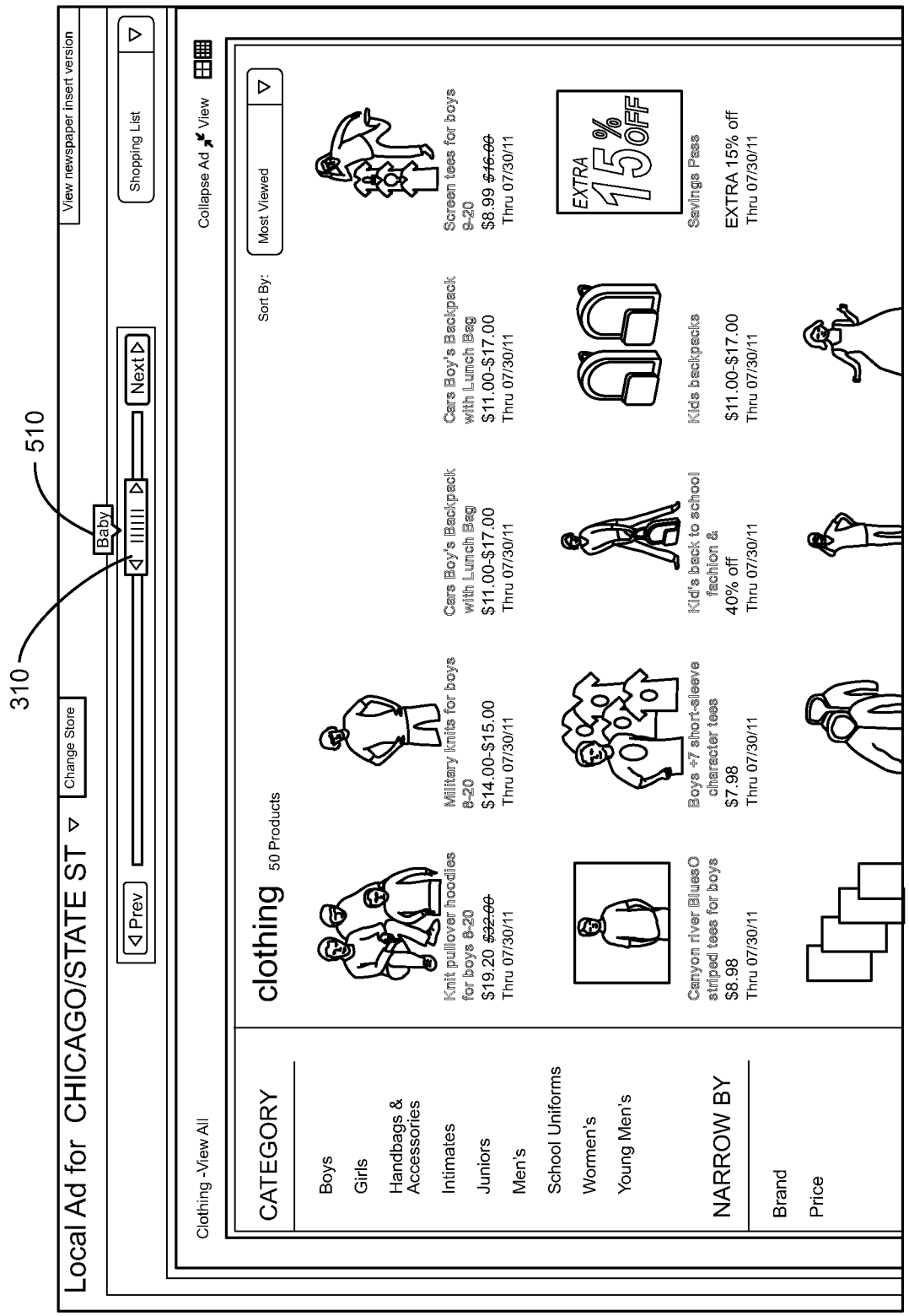
FIG. 5 illustrates a screen shot of an exemplary slider bar user interface for accessing localized product offerings in different retail departments of a retailer.
Figure 6:
FIG. 6 illustrates an exemplary listing of localized product offerings in a retail department of a retailer.

As further illustrated in FIG. 3, the product offerings publication 300 may additionally be organized to present product offerings 302 for products sold within various departments of a retailer, such as appliances, clothing, computers & electronics, etc. To allow a consumer to navigate between product offerings within these different retailer departments, the container template 300 further provides user interface elements such as selectable department icons 308, a department slider bar 310, or the like. In this manner, a consumer may click on a desired department icon 308, for example the "jewelry" labeled icon, move and then release the slider bar 310 at a desired department (where a department reflective of a location of the slider 310 is presented to a consumer via a message 510 as shown in FIG. 5) or the like whereupon the consumer will be presented with product offerings within the selected retailer department, such as illustrated in FIG. 6. It will be understood that the exemplary retailer departments are not intended to be limiting and that product offerings can be organized in any manner using the techniques described herein.

Figure 7:
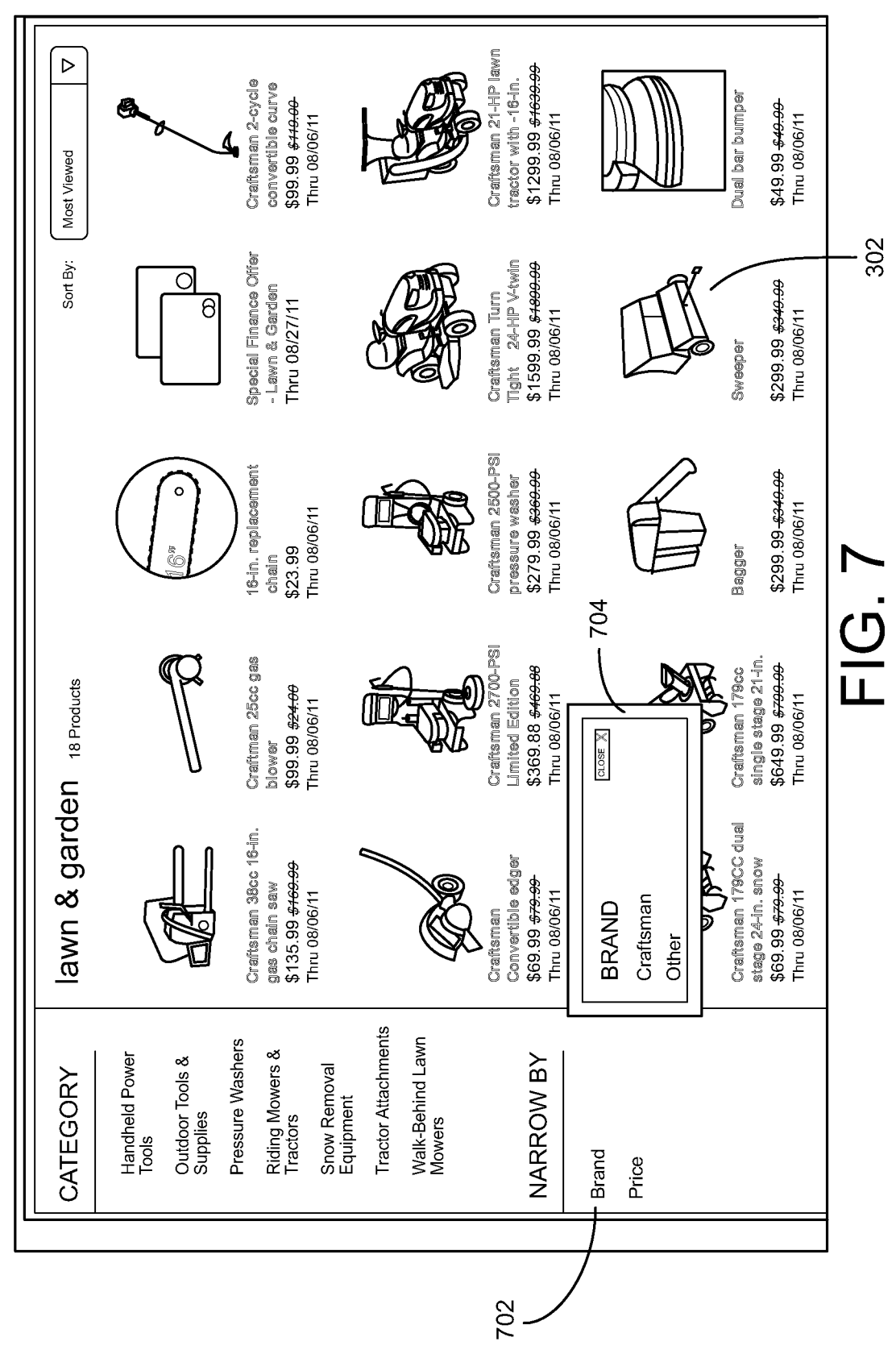
Figure 8:
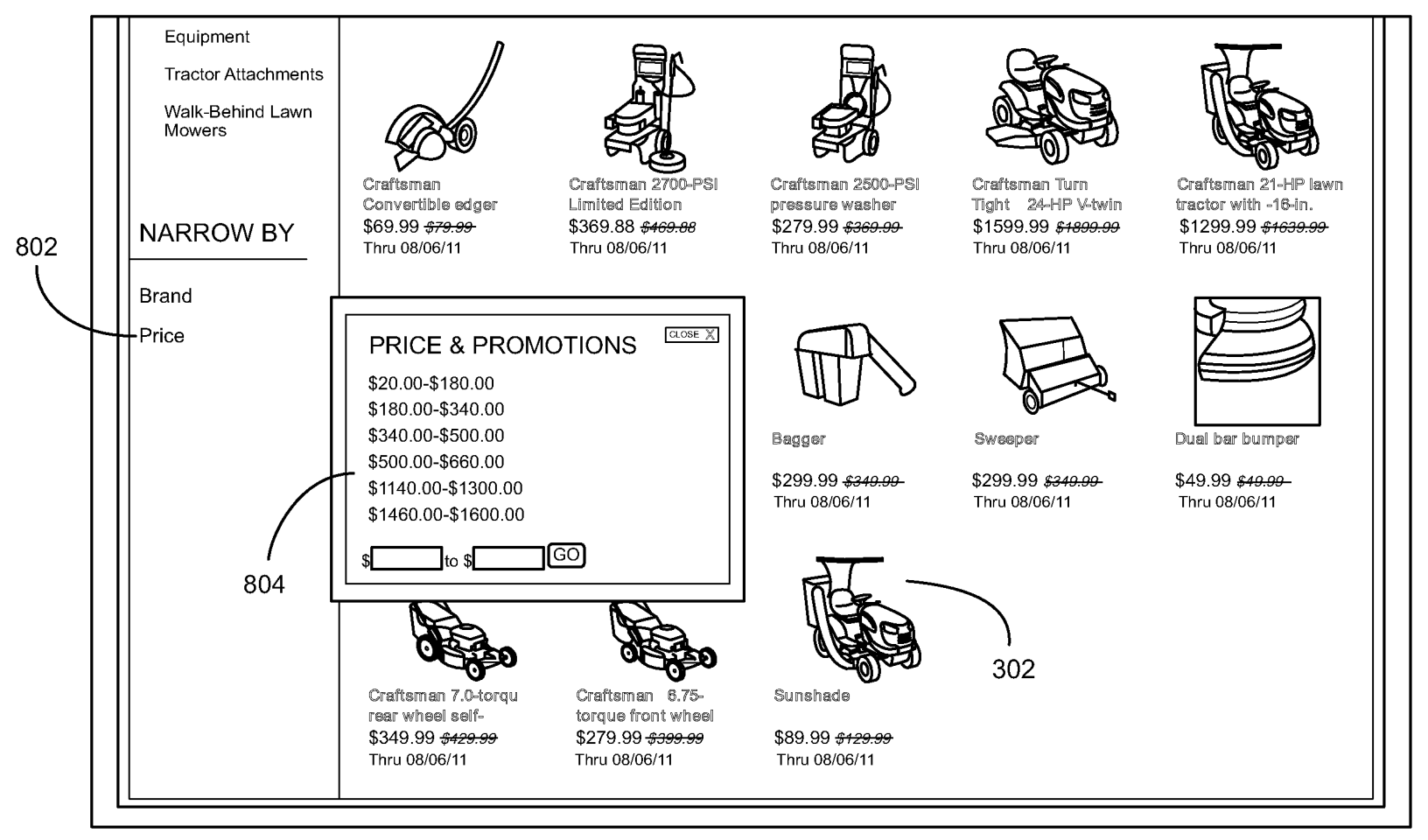
Figure 9:
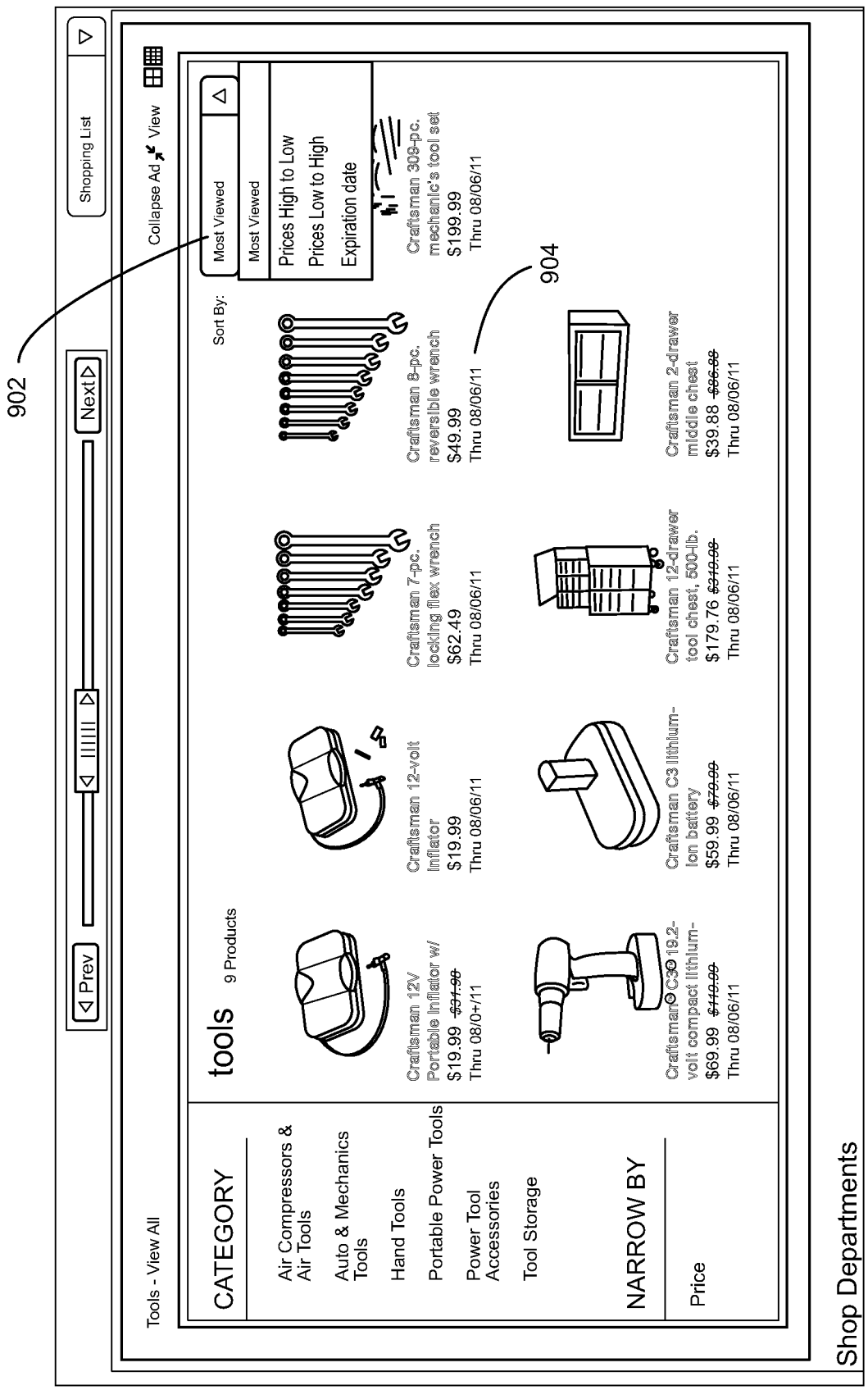
FIG. 9 illustrates an exemplary user interface for altering a presentation order of localized product offerings in a retail department of a retailer.

To allow a consumer to organize the product offerings 302 that are presented to the consumer within a product offerings publication 300, the product offerings publications may provide additional user interface elements to allow the consumer to filter the displayed product offerings. For example, the consumer can click on a filter by brand link 702 which For example, the consumer can click on a filter by brand link 702, which causes the system to present to the consumer a listing 704 of brands of products within the currently selected or active department of product offerings, for example in a pop-up window as illustrated in FIG. 7. The consumer may then click on a brand, e.g., "craftsman," within the presented listing 704, which will cause the system to include only product offerings that meet the selected brand to be presented within the currently active product offerings department. The consumer may similarly click on a filter by price link 802, which causes the system to present to the consumer with a listing of price ranges 804 for products within the currently active department of product offerings, for example in a pop-up window as illustrated in FIG. 8. The consumer may then click of a price range, e.g., "$20.00-$180.00."

or otherwise enter a custom price range, which will cause the system to include only product offerings meeting the selected price range to be presented within the currently active product offerings department. Still further, the consumer may interact with a categories menu 602 as illustrated in FIG. 6 to cause the system to include only product offerings that meet the selected category to be presented within the currently active product offerings department. Yet further, the consumer may interact with a menu 902 as illustrated in FIG. 9 to cause the product offerings within the currently active product offerings department to be displayed in an order that relates to viewings, pricing, or expiration dates of the product offerings. In this regard, the product offerings 302 each preferably indicate a valid through date 904 for the associated product offering. The provision of a valid through date 904 is particularly useful in promoting timed offers such as "door busters."

Figure 10:
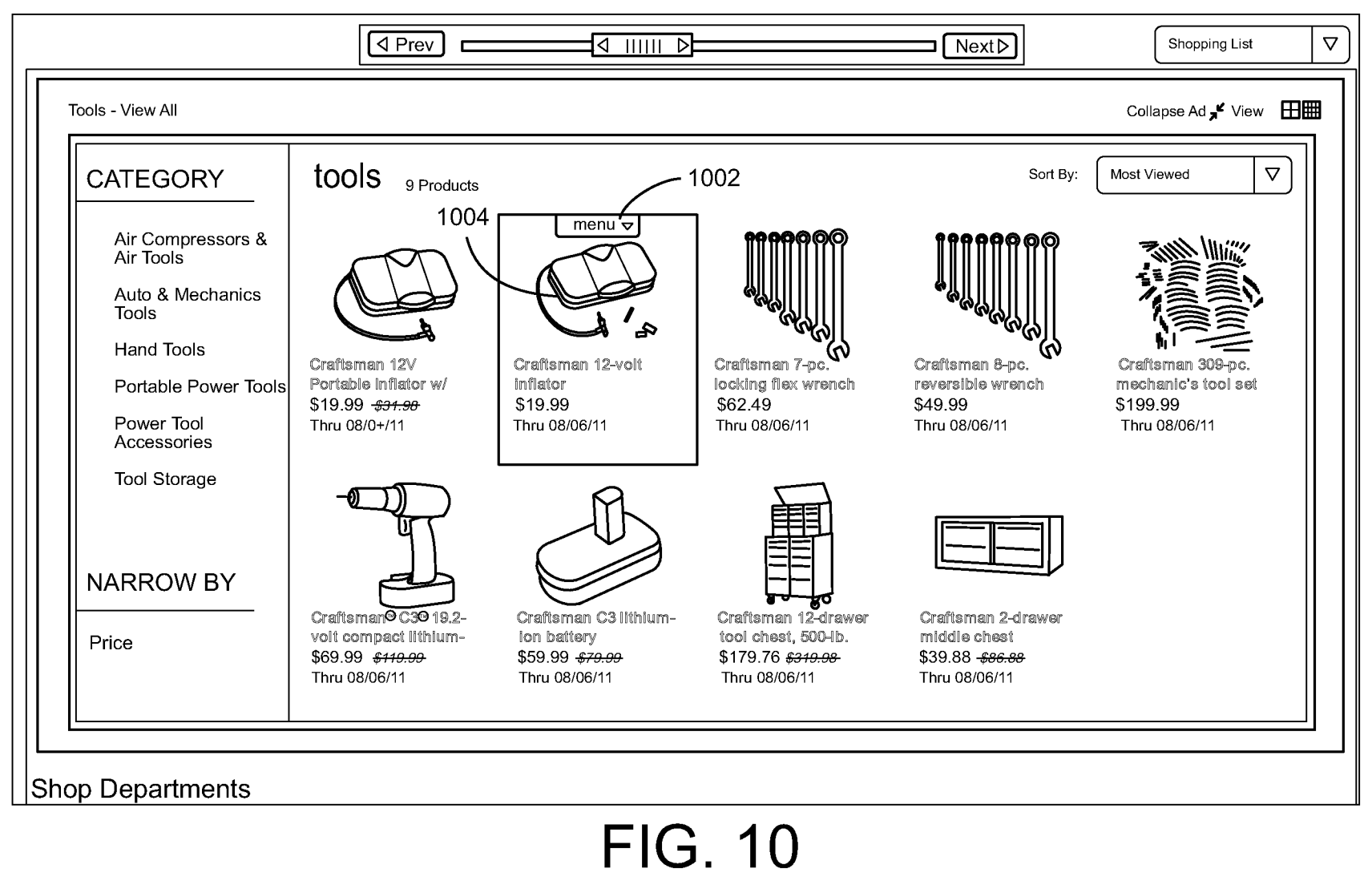
Figure 11:
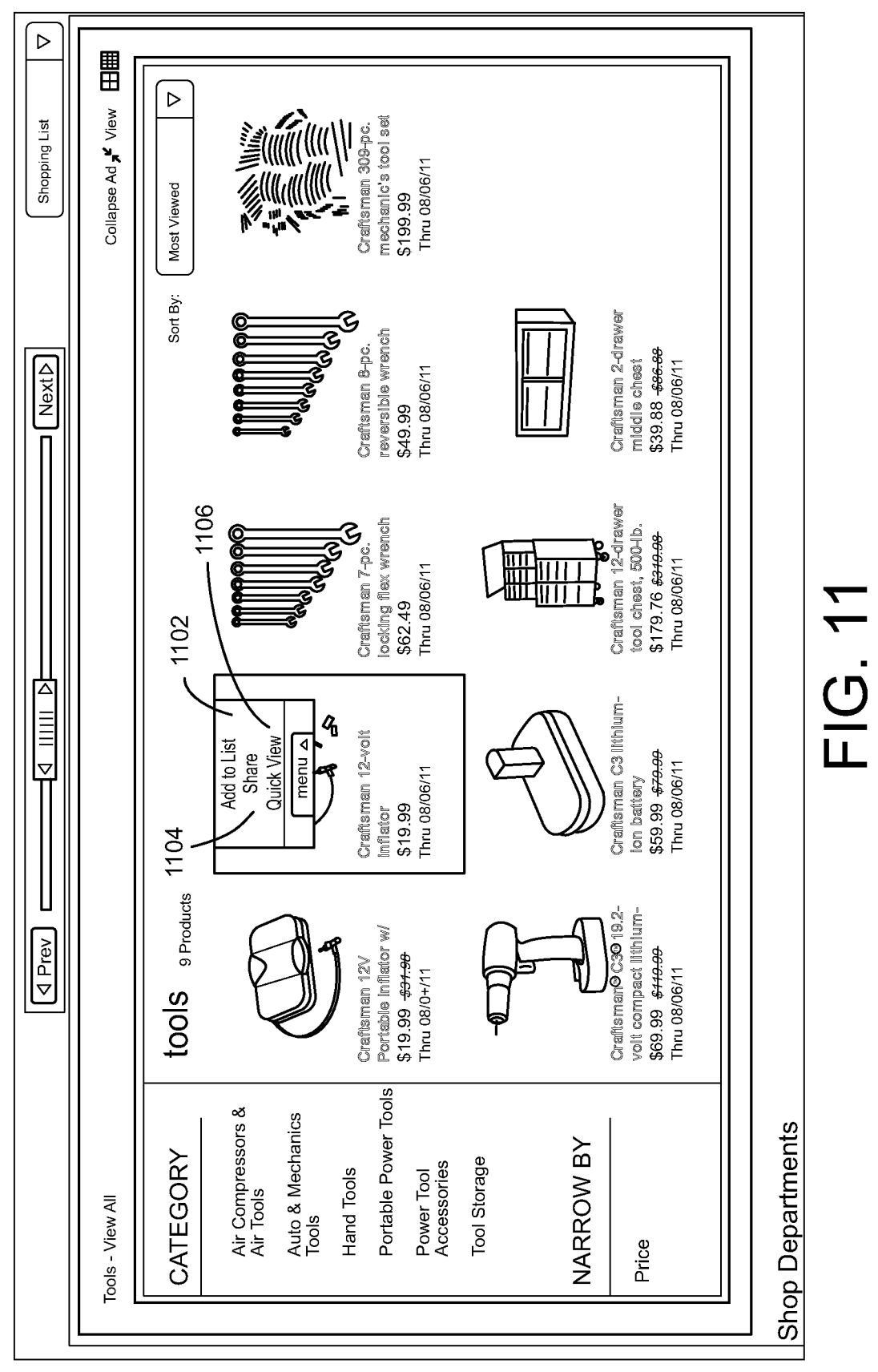
Figure 13:
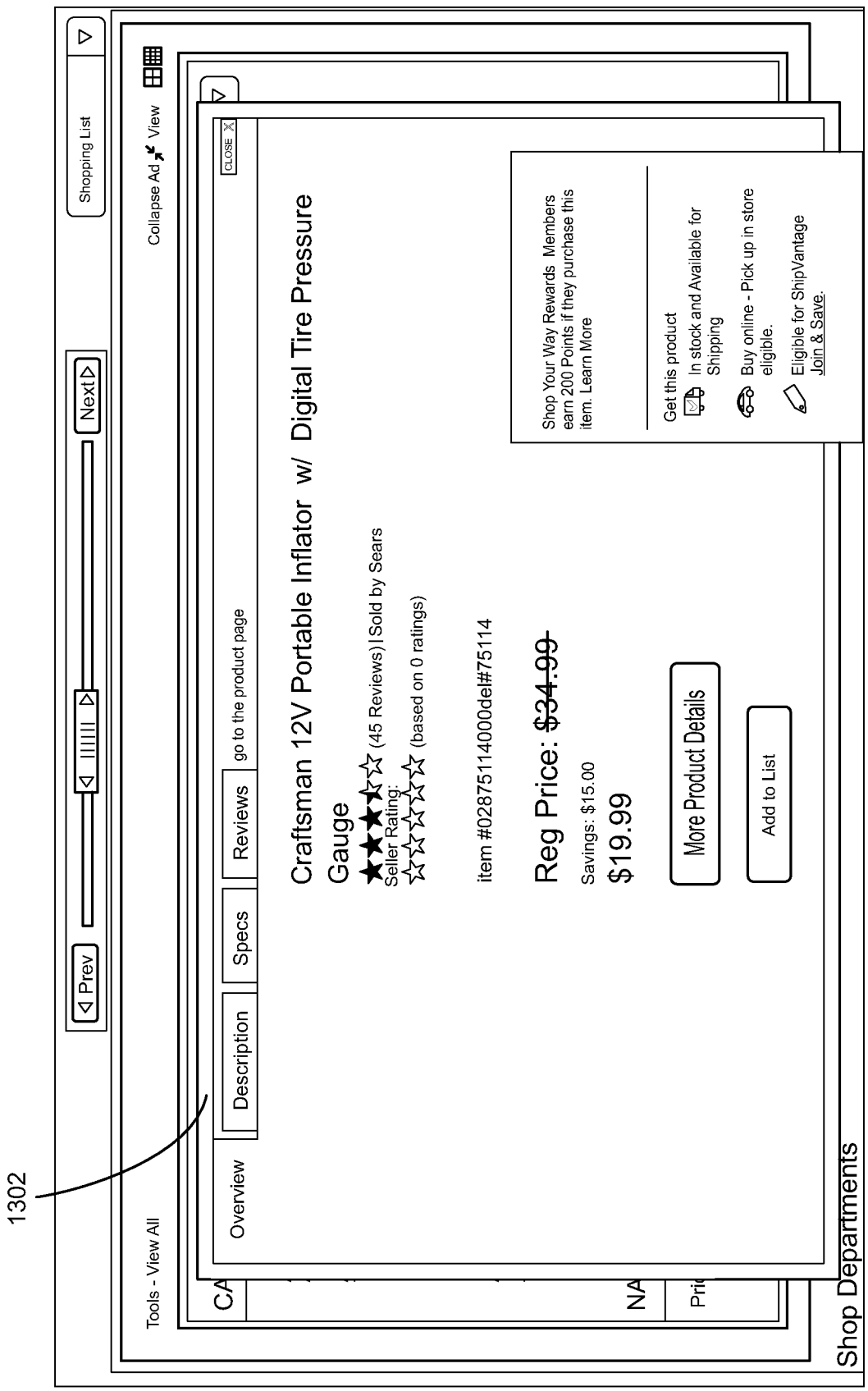

To view information related to a product shown in a product offering 302, the consumer may interact with a menu 1002, instantiated for example by mousing over a product image area 1004, as shown in FIGS. 10 and 11. More particularly, from the menu 1002, the consumer may add the product to a list 1102 associated with the customer, e.g., a "wish list," share details concerning the product offering 1104, or view 1106 additional product details. In the event that the consumer elects to share details concerning the product offering, e.g., the consumer selects link 1104, a pop-up window 1202 or the like, as illustrated in FIG. 12, may be presented to the consumer wherein the pop-up window 1202 includes links to relevant social networks, email systems, and the like. In response to a selection of any such sharing systems, the retailer system 68 will cooperate with the selected sharing system to facilitate the sharing of the indicated information as appropriate. Similarly, in the event that the consumer elects to view product details, e.g., the consumer selects link 1106, the retailer will present to the consumer in a pop-up window 1302 or the like as illustrated in FIG. 13, a brief description of the product along with further links whereby the consumer can initiate a purchase of the product (which purchase may include a consumer specify delivery/pickup for the purchased product, a request to place the product on layaway (if available), etc.), access further product details, add the product to a list, etc. In addition, the system may inform the customer of any rewards that might be earned, e.g., points that could be added to their rewards account, for purchasing the product via the interface.

In further embodiments, it is contemplated that the retailer system 68 may provide the consumer with the ability to send created lists to mobile devices, specify preferences for when the consumer is to be notified of available product offering publications, to view side-by-side product comparisons, to see competitor product offerings, to tag items for use in connection with social networks, to use incentives (e.g., coupons, reward accounts, etc.) in connection with the purchase of a product, to designate products for following, to sort products by currently trending store popularity, to recall previously viewed products, to print product offering pages, to designate product for inclusion in future product offerings, to filter by social network "fan picks," to request alternative product recommendations, and the like.

While various concepts have been described in detail, it will be appreciated by those skilled in the art that modifications and alternatives to those concepts could be developed in light of the overall teachings of the disclosure. For example, those of skill in the art will appreciate that the ordering of the steps described herein and illustrated in the figures can be modified without departing from the scope of the invention claimed hereinafter. Similarly, those of skill the art will appreciate that certain of the steps described herein may be considered to be optional. Yet further, while various aspects of the invention have been described in the context of functional modules and components, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A non-transitory, computer-readable medium having stored thereon instructions executable by a retailer computing system of a merchant having a plurality of locations, the instructions causing the retailer computing system to perform steps, comprising:

providing a software application to terminal devices of the plurality of consumers, wherein the terminal devices comprise mobile devices that comprise processors, location determining systems, wireless communication interfaces, and graphical user interfaces, wherein the location determining systems comprise GPS systems, wherein selections of graphical elements of the graphical user interfaces allow the consumers to manipulate presentations of information including providing side-by-side product comparisons with competitor product offerings, and to optimize one or more processes of an engine that is configured to select product offerings for inclusion in product offerings publications;

providing cookies to the mobile devices to enable the retailer computing system to optimize the one or more processes of the engine that is configured to select the product offerings for inclusion in the product offerings publications, wherein the cookies enable the retailer computing system to track products viewed and products purchased via the mobile devices;

receiving location information from the wireless interfaces of the mobile devices that is based on the information received by the GPS systems of the mobile devices;

receiving, via selections of graphical elements of the graphical user interfaces, information representative of retail product transactions of the plurality of consumers at a retailer computing system configured to interact with terminal devices of the plurality of consumers via a network, the retailer computing system comprising one or both of a processor and a memory that store a plurality of templates for electronic product offering publications, information identifying product items available in inventory of the merchant, data representative of geographic locations received from corresponding terminal devices of the plurality of consumers, and personal preferences corresponding to each of the plurality of consumers including when notifications are to be sent to the consumer and product filters that have been selected by the consumer, and wherein the retailer computing system:

includes an engine that is optimized based on responses of the consumers, via selections of graphical elements of the graphical user interfaces, to personalized electronic product offerings publications and location coordinates received from the location determining systems of the terminal devices;

adjusts the information identifying product items in inventory of each merchant location according to the information representative of the retail product transactions of the plurality of consumers;

sends a notification of an available electronic product offering publication to the software application of the terminal device of a particular consumer, in accordance with a personal preference of when notifications are to be sent to the particular consumer;

receives, from the software application in the terminal device of the particular consumer, data representative of a current geographic location of the particular consumer and an explicit user request to view an electronic product offerings publication;

in response to receipt of the user request:

filters the information identifying product items available in inventory of a particular location of the plurality of merchant locations according to the personal preferences, the product filters, and the data representative of a geographic location, of the particular consumer, to identify one or more product items for publication to the particular consumer;

constructs a personalized electronic product offerings publication for the particular consumer by populating the one or more product items for publication into a template from the plurality of templates corresponding to the particular location of the plurality of merchant locations, wherein the pricing of the one or more items in the personalized electronic product offerings publication is based on weightings of a plurality of factors including inventory, competitive pricing, and price elasticity, wherein the product items selected for population within the personalized electronic product offerings publication are filterable by the retailer computer system according to popularity, and wherein the product items selected for population within the personalized electronic product offerings publication are determined based on real-time inventory information when the particular consumer requests access to the personalized product offerings publication; and transmits the personalized electronic product offerings publication to the software application in the terminal device of the particular consumer, for display; and selecting one or more graphical elements of the graphical user interface to designate a particular product item for following and inclusion in a future product offerings publication, wherein the particular product item is based on a wish list and a life event of the particular consumer, and wherein the particular product item is associated with an expiration date.

2. The non-transitory, computer-readable medium as recited in claim 1, wherein the engine is optimized based on responses of the consumers to personalized electronic product offerings publications, the location coordinates received from the location determining systems of the terminal devices, and predicted weather conditions for the received location coordinates.

3. The non-transitory, computer-readable medium as recited in claim 1, wherein information identifying product items available in inventory of the merchant is retrieved from an inventory management system in real-time, and wherein the request to view the electronic product offerings publication is received from a mobile application (app).

4. The non-transitory, computer-readable medium as recited in claim 1, wherein the request to view the electronic product offerings publication is received from a browser application or an email application.

5. The non-transitory, computer-readable medium as recited in claim 1, wherein the terminal devices include location determining systems and graphical user interfaces, and comprising:

determining locations of the terminal devices from location coordinates provided by the location determining systems of the terminal devices.

6. The non-transitory, computer-readable medium as recited in claim 1, comprising:

receiving information indicative of shopping behavior of the user comprising viewing of product information, wherein the information indicative of the shopping behavior of the user is also used to select product offerings from the information identifying product items available in inventory of the merchant.

7. The non-transitory, computer-readable medium as recited in claim 1, comprising:

receiving information indicative of a condition associated with the geographic location of the particular consumer, wherein the information indicative of the condition is also used to select product offerings from the information identifying product items available in inventory of the merchant.

8. The non-transitory, computer-readable medium as recited in claim 7, wherein the condition associated with the geographic location of the particular consumer comprises at least one of a current weather condition and a forecast weather condition.

9. The non-transitory, computer-readable medium as recited in claim 1, comprising:

receiving competitive pricing information associated with the geographic location of the particular consumer, wherein the competitive pricing information is used to dynamically alter product pricing within the personalized electronic product offerings publication.

10. The non-transitory, computer-readable medium as recited in claim 1, comprising:

receiving data indicative of one or more actions by the particular consumer regarding product items within a previously published electronic product offerings publication transmitted to the particular consumer, wherein the data indicative of the one or more actions is also used to select product items from the information identifying product items available in inventory of the merchant for use in constructing the personalized electronic product offerings publication.

11. The non-transitory, computer-readable medium as recited in claim 1, wherein the product items selected for population within the personalized electronic product offerings publication are filterable according to popularity of the product items with members of a social networking system.

12. The non-transitory, computer-readable medium as recited in claim 1, wherein the product items selected for population within the personalized electronic product offerings publication are filterable by brand.

13. The non-transitory, computer-readable medium as recited in claim 1, wherein the product items selected for population within the personalized electronic product offerings publication are filterable by price.

14. The non-transitory, computer-readable medium as recited in claim 1, wherein the product items selected for population within the personalized electronic product offerings publication are filterable by product category.

15. The non-transitory, computer-readable medium as recited in claim 1, wherein the personalized electronic product offerings publication includes one or more links for sharing information related to one or more product items within the personalized electronic product offerings publication.

16. The non-transitory, computer-readable medium as recited in claim 15, wherein the one or more links include a link to a social networking system.

17. The non-transitory, computer-readable medium as recited in claim 15, wherein the one or more links include a link to an email system.

18. The non-transitory, computer-readable medium as recited in claim 1, wherein the personalized electronic product offerings publication includes one or more links for facilitating a purchase of a product associated with a product item populated within the personalized electronic product offerings publication.

19. The non-transitory, computer-readable medium as recited in claim 1, wherein the data indicative of a geographic location comprises a user provided zip code.

20. The non-transitory, computer-readable medium as recited in claim 1, wherein the data representative of a geographic location comprises location data generated by the terminal device of the particular consumer.

* * * * *